(12) United States Patent
Lee et al.

(10) Patent No.: US 6,888,880 B2
(45) Date of Patent: May 3, 2005

(54) APPARATUS FOR SEARCHING FOR A CELL AND METHOD OF ACQUIRING CODE UNIQUE TO EACH CELL IN AN ASYNCHRONOUS WIDEBAND DS/CDMA RECEIVER

(75) Inventors: Kang-min Lee, Seongnam (KR); Ji-yong Chun, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 861 days.

(21) Appl. No.: 09/758,040

(22) Filed: Jan. 11, 2001

(65) Prior Publication Data

US 2001/0021199 A1 Sep. 13, 2001

(30) Foreign Application Priority Data

Jan. 11, 2000 (KR) .......................................... 2000-1190

(51) Int. Cl.$^7$ ................................................ H04B 1/69
(52) U.S. Cl. ........................................ 375/149; 375/150
(58) Field of Search ............................... 375/149, 150, 375/147, 141, 142, 145, 130; 370/342, 441, 322, 335; 455/422

(56) References Cited

U.S. PATENT DOCUMENTS 6,741,578 B1 * 5/2004 Moon et al. ................ 370/335

FOREIGN PATENT DOCUMENTS

| EP | 1 035 665 | 9/2000 |
| EP | 1 071 224 A1 | 1/2001 |
| EP | 1-117-188 A2 * | 7/2001 |
| WO | WO 00/48329 | 8/2000 |

OTHER PUBLICATIONS

Wang Y.-P.E et al., "Cell Search in W-CDMA," IEEE Journal on Selected Area in Communications, vol. 18, No. 8 Aug. 2000, pp1470–1482.*
Song et al., "Performance Analysis of Cell Search in W-CDMA System Over Rayleigh Fading Channels," IEEE Transactions on Vehicular Technology, vol. 51, No. 4, Jul. 2002, pp 749–759.*
Lee, Kang-Min, et al., Digital Communication Lab. SAIT, vol. 2, pp. 1400–1404, (Sep. 18, 2000).
"UMTS Terrestrial Radio Access Concept Evaluation", ETSI Tech. Rep.,XP002109765, pp. 47–48, (Dec. 1997).

* cited by examiner

Primary Examiner—Tesfaldet Bocure
(74) Attorney, Agent, or Firm—Lee, Sterba & Morse, P.C.

(57) ABSTRACT

An apparatus for searching for a cell and a method of acquiring a code unique to each cell in an asynchronous wideband Direct-Sequence Code Division Multiple Access (DS/CDMA) receiver, wherein the cell searching apparatus searches for a cell based on a received asynchronous wideband DS/CDMA signal in a receiver, the apparatus including a code group identifying unit for estimating and compensating for a frequency error between the synchronous channel and an internally generated primary synchronization code, estimating and compensating for channel degradation which the synchronous channel has experienced, and performing correlation on the compensated synchronous channel and available secondary synchronization codes, thereby identifying the code group; and a scrambling code identifying unit for performing correlation on a plurality of scrambling codes belonging to the code group, thereby obtaining a scrambling code unique to each cell.

10 Claims, 4 Drawing Sheets

APPARATUS FOR SEARCHING FOR A CELL AND METHOD OF ACQUIRING CODE UNIQUE TO EACH CELL IN AN ASYNCHRONOUS WIDEBAND DS/CDMA RECEIVER

BACKGROUND OF THE INVENTION

1. Field of the Invention

The present invention relates to an apparatus for searching for a cell and a method of acquiring a code unique to each cell in an asynchronous wideband Direct-Sequence Code Division Multiple Access (DS/CDMA) receiver.

2. Description of the Related Art

An asynchronous wideband DS/CDMA system is one of the International Mobile Telecommunication (IMT)-2000 standard recommendations and it is expected to play an important role in the next generation of mobile communications. There are two types of systems in a DS/CDMA system: a synchronous system and an asynchronous system. The synchronous system synchronizes cells using an external timing source such as a global positioning system. On the other hand, the asynchronous system does not synchronize cells.

In a DS/CDMA system, cells are distinguished from each other by a spreading code. In a synchronous system capable of controlling the synchronization of cells, a spreading code with a different phase is assigned to each cell. In other words, a single unique spreading code is used. On the other hand, an asynchronous system, which does not use time information, assigns a different spreading code to each cell.

In a DS/CDMA system, a cell search indicates a procedure in which a mobile station (MS) searches for an optimal cell when the communication between the MS and a base station (BS) begins and acquires a spreading code assigned to the cell and the synchronization of the code. It is usually more difficult and takes more time to search for a cell in an asynchronous system than in a synchronous system. In a synchronous system in which the same spreading code is assigned to all cells, the only process that must be done is to obtain the phase of the code. In the asynchronous system, in addition to the phase of the spreading code, the code sequence should be obtained. Therefore, the cell search is very difficult and important in an asynchronous wideband CDMA system.

In a wideband CDMA system, spreading codes distinguishing cells are referred to as scrambling codes. There are 512 scrambling codes. If all of the 512 scrambling codes must be searched during a cell search, it requires extensive time and processing. To overcome this problem, the conceptions of a code group and a Synchronous CHannel (SCH) are applied to the wideband CDMA system. A code group is one of the groups into which the scrambling codes are divided. Each cell is allocated a unique code group. As a result, the number of scrambling codes to be searched by a MS can be decreased. Sixty-four (64) code groups exist in the wideband CDMA system, and eight (8) scrambling codes are allocated to each code group. Accordingly, once a code group is detected during a cell search, the number of scrambling codes to be searched is decreased to 8. A code group allocated to each cell is determined by a SCH.

A SCH, which is a downlink physical channel used for a cell search, is time-multiplexed with a primary Common Control Physical CHannel (p-CCPCH) and transmitted at every slot. The SCH is a kind of a control channel and is composed of a Primary Synchronization Code (PSC) and a secondary synchronization code (SSC). The PSC and the SSC are simultaneously transmitted at every slot.

FIGS. 1(a) through 1(c) illustrate a SCH in a hierarchical structure. FIG. 1(a) illustrates a single superframe composed of 72 frames. The duration of a single super frame is 720 ms. FIG. 1(b) illustrates a single frame composed of 15 slots. The duration of a single frame is 10 ms. FIG. 1(c) illustrates a single slot composed of a p-CCPCH composed of 9 symbols and a PSC $C_p$ and a SSC $C_s^i$ which are each composed of one symbol. The duration of a single slot is 0.667 ms, and one symbol is composed of 256 chips.

Each of the PSC and the SSC is a code sequence composed of 256 chips. In a wideband CDMA system, there is a single unique PSC common for every cell and there are 16 different SSCs for 15 slots in one frame. In addition, the PSC is orthogonal to the SSC. A cell search is performed using a SCH. The boundary of a slot is found through the slot synchronization, and a code group is identified based on the correlation between the SSC and a received signal. Once the code group is identified, a scrambling code allocated to each cell is detected.

Accordingly, it is necessary to exactly detect a SSC transmitted through the SCH of each slot for identifying a code group. In an ideal environment, for each of the 15 received slots, the SCH signal of the received slot is correlated with the 16 SSCs, and the SSC that gives the maximum correlation value is detected. However, under actual conditions, the performance is degraded due to various factors. The primary factors contributing to the degradation of performance are noise, a change in a channel due to the movement of a MS, a frequency error due to a mismatch between the oscillators of a transmitter and a receiver and the like.

Among the above factors, the frequency error is an unavoidable phenomenon due to the physical characteristics of a device in a communication system and considerably degrades the performance of the system. Particularly in a wideband DS/CDMA system in which a cell search is performed by correlating a received signal with various codes, a frequency error exerts a negative influence on a correlation property. As a result, a cell search probability decreases, and a cell search time increases.

To minimize the degradation of performance due to the above factors, the results of correlations between a received signal and SSCs are combined with each other throughout a plurality of frames. A combining method includes a coherent combining method and a noncoherent combining method. The coherent combining method is robust to noise but degrades the performance more severely when a channel state is changed severely or a frequency error occurs. On the other hand, the noncoherent combining method is robust to a channel state change and a frequency error but severely degrades the performance when a signal-to-noise ratio (SNR) is decreased due to significant noise. In an ideal additive white Gaussian noise (AWGN) channel without a frequency error, the performance of the coherent combining method is superior to that of the noncoherent combining method by about 3 dB. Accordingly, it is preferable to remove a frequency error and the influence of a channel from a received signal and use the coherent combining method.

SUMMARY OF THE INVENTION

In an effort to solve the above problems, it is a feature of an embodiment of the present invention to provide an apparatus for searching for a cell and a method of acquiring a code unique to each cell, through frequency error and channel estimation, compensation for a received signal using the estimated values, and coherently combining the results of the correlation between the compensated signal and secondary synchronization codes (SSCs) in an asynchronous wideband direct-sequence code division multiple access (DS/CDMA) receiver.

In accordance with this feature of an embodiment of the present invention, there is provided a cell searching apparatus which searches for a cell based on a received asynchronous wideband DS/CDMA signal in a receiver, the received signal including a data channel and a synchronous channel composed of a primary synchronization code commonly used in every cell and a secondary synchronization code indicating a code group unique to each cell. The cell searching apparatus includes a code group identifying unit for estimating and compensating for a frequency error between the synchronous channel and an internally generated primary synchronization code, estimating and compensating for channel characteristics which the synchronous channel has experienced, and correlating the compensated synchronous channel with available secondary synchronization codes, thereby identifying the code group; and a scrambling code identifying unit for correlating a plurality of scrambling codes belonging to the code group with the data channel, thereby obtaining a scrambling code unique to each cell.

There is also provided a method of acquiring a scrambling code included in a code group from an asynchronous wideband DS/CDMA signal received in an asynchronous wideband DS/CDMA receiver, the received signal including a data channel and a synchronous channel composed of a primary synchronization code commonly used in every cell and a secondary synchronization code indicating a unique code group of each cell, the scrambling code being a spreading code unique to each cell. The method includes: (a) estimating and compensating for a frequency error between the synchronous channel and a primary synchronization code generated by a primary synchronization code generator; (b) estimating and compensating for characteristics of a channel which the synchronous channel has experienced; (c) correlating the compensated synchronous channel with available secondary synchronization codes, thereby identifying a secondary synchronization code included in the synchronous channel; and (d) correlating a plurality of scrambling codes belonging to a code group represented by the secondary synchronization code with the data channel to obtain a scrambling code unique to each cell. These and other features of the invention will be readily apparent to those of ordinary skill in the art upon review of the detailed description that follows.

BRIEF DESCRIPTION OF THE DRAWINGS

The above and other features and advantages of the present invention will become more apparent by describing in detail a preferred embodiment thereof with reference to the attached drawings in which.

DETAILED DESCRIPTION OF A PREFERRED EMBODIMENT

Korean patent application number 00-1190, filed Jan. 11, 2000, and entitled: "Apparatus for Searching for Cell and Method of Acquiring Code Unique to Each Cell in Asynchronous Wideband Receiver," is incorporated by reference herein in its entirety.

Figure 1:
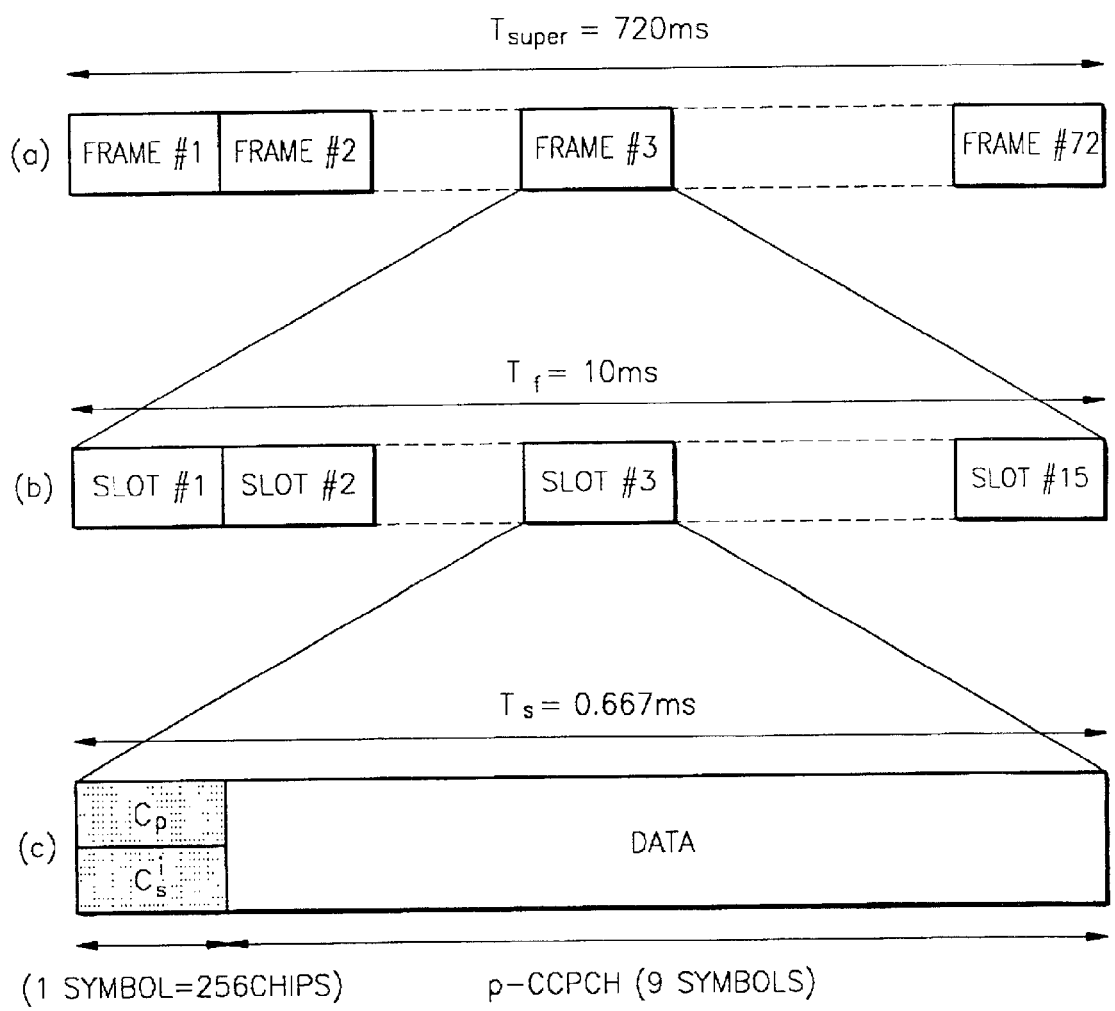
FIG. 1 is a diagram that illustrates a Synchronous CHannel (SCH) in a hierarchical structure.
Figure 2:
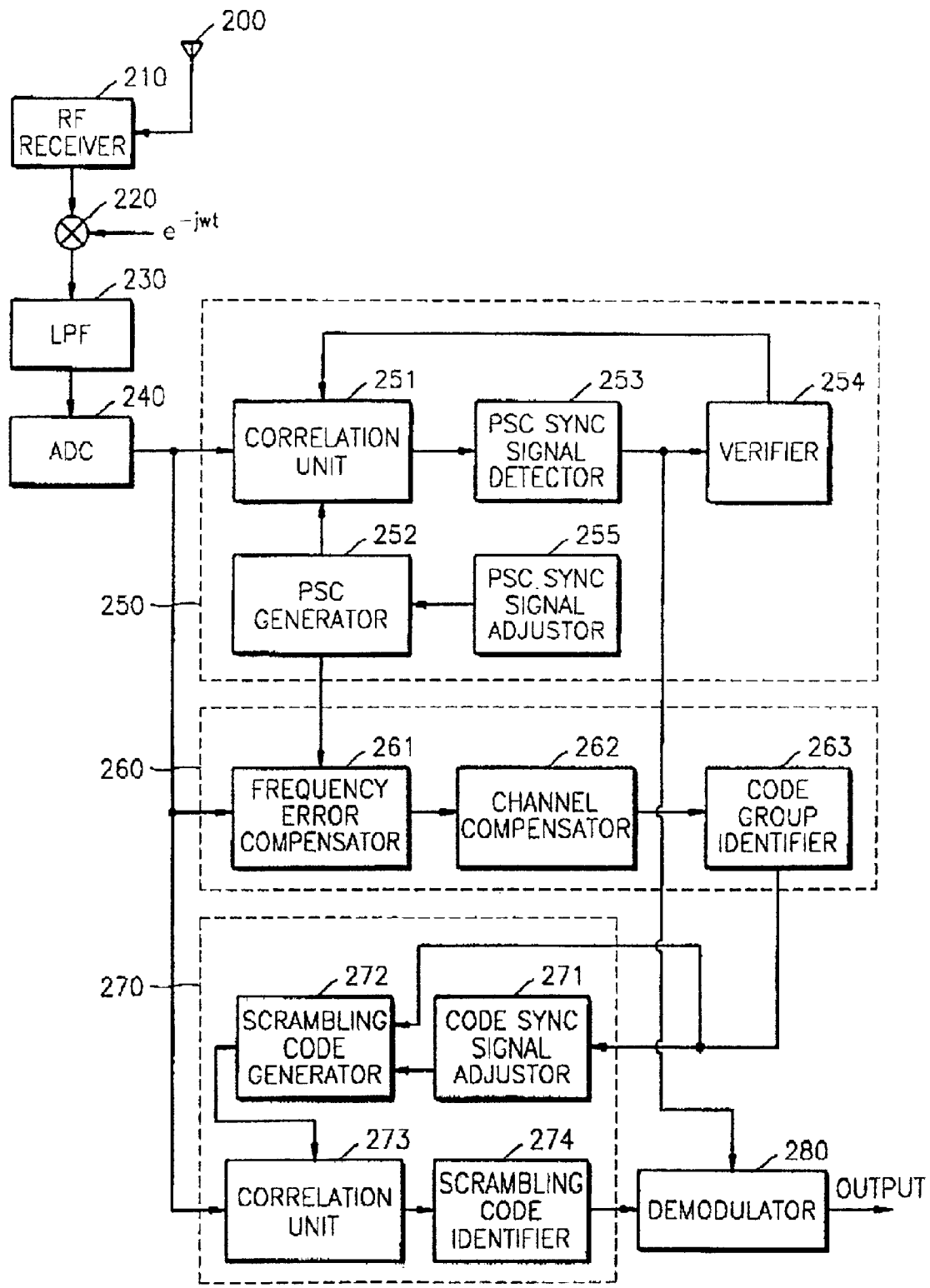
FIG. 2 is a block diagram that illustrates a wideband direct-sequence code division multiple access (DS/CDMA) receiver according to the present invention.

Referring to FIG. 2, a wideband direct-sequence code division multiple access (DS/CDMA) receiver includes an antenna 200, a radio frequency (RF) receiver 210, a down converter 220, a low-pass filter (LPF) 230, an analog to digital converter (ADC) 240, a slot synchronizer 250, a code group identifying unit 260, a scrambling code identifying unit 270 and a demodulator 280. The slot synchronizer 250 includes a correlation unit 251, a primary synchronization code (PSC) generator 252, a PSC sync signal detector 253, a verifier 254 and a PSC sync signal adjustor 255. The code group identifying unit 260 includes a frequency error compensator 261, a channel compensator 262 and a code group identifier 263. The scrambling code identifying unit 270 includes a code sync signal adjustor 271, a scrambling code generator 272, a correlation unit 273 and a scrambling code identifier 274.

In the operation of the above wideband DS/CDMA receiver, the RF receiver 210 receives a RF signal via the antenna 200 and converts it into an intermediate frequency (IF) signal. The down converter 220, the LPF 230 and the ADC 240 convert the IF signal down to a baseband discrete signal.

The slot synchronizer 250 detects the boundary of a slot from a Synchronous CHannel (SCH) output from the ADC 240. In other words, a point at which a peak is detected from the output of a matched filter for a PSC is a synchronous point of a slot. The correlation unit 251 correlates a PSC output from the PSC generator 252 with the output SCH of the ADC 240. The PSC sync signal detector 253 detects the sync signal of the slot from the output of the correlation unit 251. The PSC sync signal adjustor 255 adjusts the sync signal of the slot output from the PSC sync signal detector 253 to match it with the sync signal of the received signal and outputs the result of the adjustment to the PSC generator 252. The verifier 254 verifies whether the sync signal of the slot is detected by the PSC sync signal detector 253 and outputs the result of the verification to the correlation unit 251.

The code group identifying unit 260 compensates the output SCH of the ADC 240 for a frequency error and for channel degradation to identify a code group. The code group is determined based on a secondary synchronization code (SSC). A single frame is composed of 15 slots. One of 16 SSCs is transmitted simultaneously with a PSC for each slot. In other words, 15 SSCs are transmitted during the transmission of one frame. A code group is determined based on the consecutive 15 SSCs transmitted during the transmission of one frame. The code group identifying unit 260 identifies the code group and acquires the frame sync signal by detecting transmitted SSCs based on slot synchronization information obtained by the slot synchronizer and the results of correlations between the 16 SSCs and the output SCH of the ADC 240. The frequency error compensator 261 estimates the frequency error between the PSC generated by the PSC generator 252 and the output SCH of the ADC 240 and compensates the SCH output from the ADC 240 for the estimated frequency error. The output SCH of the ADC 240 includes a frequency error ω caused by mismatch in oscillation frequency between a transmitter and a receiver. The channel compensator 262 estimates the characteristics of a complex channel from the output signal of the frequency error compensator 261 and compensates the output signal of the frequency error compensator 261 for the estimated characteristics. The code group identifier 263 correlates the output signal of the channel compensator 262 with the 16 SSCs and coherently combines the results of the correlations for every frame, thereby detecting SSCs and acquiring a frame synchronization.

The scrambling code identifying unit 270 correlates 8 scrambling codes contained in the code group determined by the code group identifying unit 260 with the output data of the ADC 240 and obtains a scrambling code allocated to each cell. The code sync signal adjustor 271 adjusts the sync signal of a scrambling code using a frame sync signal detected by the code group identifier 263. The scrambling code generator 272 generates 8 scrambling codes belonging to the code group identified by the code group identifier 263 based on a sync signal adjusted by the code sync signal adjustor 271. The correlation unit 273 correlates the output data of the ADC 240 with each of the 8 scrambling codes generated by the scrambling code generator 272. The scrambling code identifier 274 identifies a scrambling code based on the results from the correlation unit 273.

The demodulator 280 performs typical RAKE processing and demodulation and outputs data.

Figure 3:
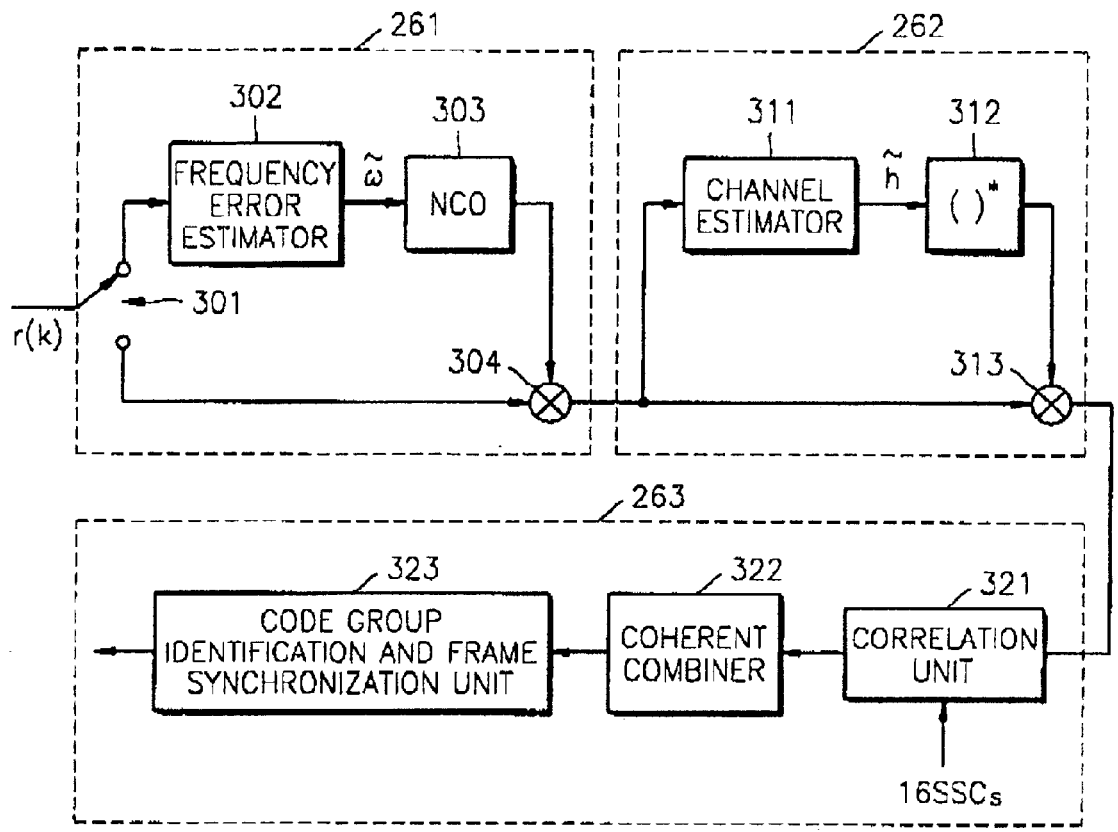
FIG. 3 is a detailed block diagram that illustrates the code group identifying unit of FIG. 2.

FIG. 3 is a detailed block diagram that illustrates the code group identifying unit 260 of FIG. 2. The frequency error compensator 261 includes a switch 301, a frequency error estimator 302, a numerically controlled oscillator (NCO) 303 and a multiplier 304. The channel compensator 262 includes a channel estimator 311, a complex conjugator 312 and a multiplier 313. The code group identifier 263 includes a correlation unit 321, a coherent combiner 322 and a code group identification and frame synchronization unit 323.

In operation, the frequency error compensator 261 estimates a frequency error with respect to the output SCH of the ADC 240 and compensates for the estimated frequency error. The frequency error estimator 302 outputs an estimate ω₀ for the frequency error ω between the output SCH of the ADC 240, which is input through the switch 301, and the PSC generated by the PSC generator 252. The NCO 303 generates a complex sinusoidal wave corresponding to the estimate ω₀. The multiplier 304 multiplies the complex sinusoidal wave output from the NCO 303 by the output SCH of the ADC 240 to compensate for the frequency error. The estimation of a frequency error will be described later in more detail with reference to FIG. 5.

The channel compensator 262 estimates a channel characteristics included in the output SCH of the ADC 240 and compensates the output SCH of the ADC 240 for the estimated characteristics. The channel estimator 311 estimates channel characteristics using a typical method. Parameters necessary for channel estimation are updated for each slot using the correlation values between a signal whose frequency error has been compensated for by the multiplier 304 and a PSC. The complex conjugator 312 obtains a complex conjugate with respect to the estimated channel characteristics. The multiplier 313 multiplies the output signal of the multiplier 304 by the output of the complex conjugator 312 to compensate for the channel characteristics. Therefore, the frequency error and the influence of the channel characteristics can be removed from the output SCH of the ADC 240.

The code group identifier 263 identifies a code group included in the output SCH of the ADC 240 and acquires a frame sync signal. The correlation unit 321 correlates the output signal of the multiplier 313 with the 16 SSCs. Here, the correlation unit 321 performs 16-point fast Hadamard transform. The coherent combiner 322 coherently combines the outputs of the correlation unit 321 for every frame. It is preferable to use a coherent combining method because the frequency error and the influence of the channel characteristics have been removed. The code group identification and frame synchronization unit 323 detects a SSC at which the output value of the coherent combiner 322 exceeds a predetermined threshold or at which the output value is maximum. Thus, 15 SSCs transmitted during the duration of a single frame can be detected. The code group identification and frame synchronization unit 323 also acquires a frame synchronizing signal.

Figure 4:
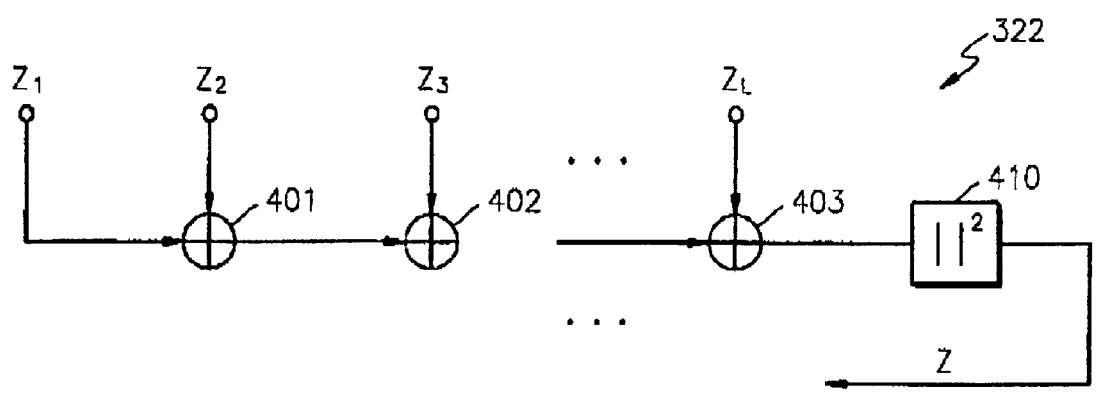
FIG. 4 is a detailed diagram that illustrates the coherent combiner of FIG. 3.

FIG. 4 is a detailed block diagram that illustrates the coherent combiner 322. The coherent combiner 322 includes a plurality of adders 401 through 403 and a squarer 410. When the outputs from the correlation unit 321 are $Z_1$, $Z_2$, ... $Z_L$, the adders 401 through 403 accumulatively add the outputs. The squarer 410 squares the sum of the outputs from the correlation unit 321 and outputs a coherently combined value Z as follows.

$$Z = \left| \sum_{i=0}^{L} Z_i \right|^2 \tag{1}$$

Figure 5:
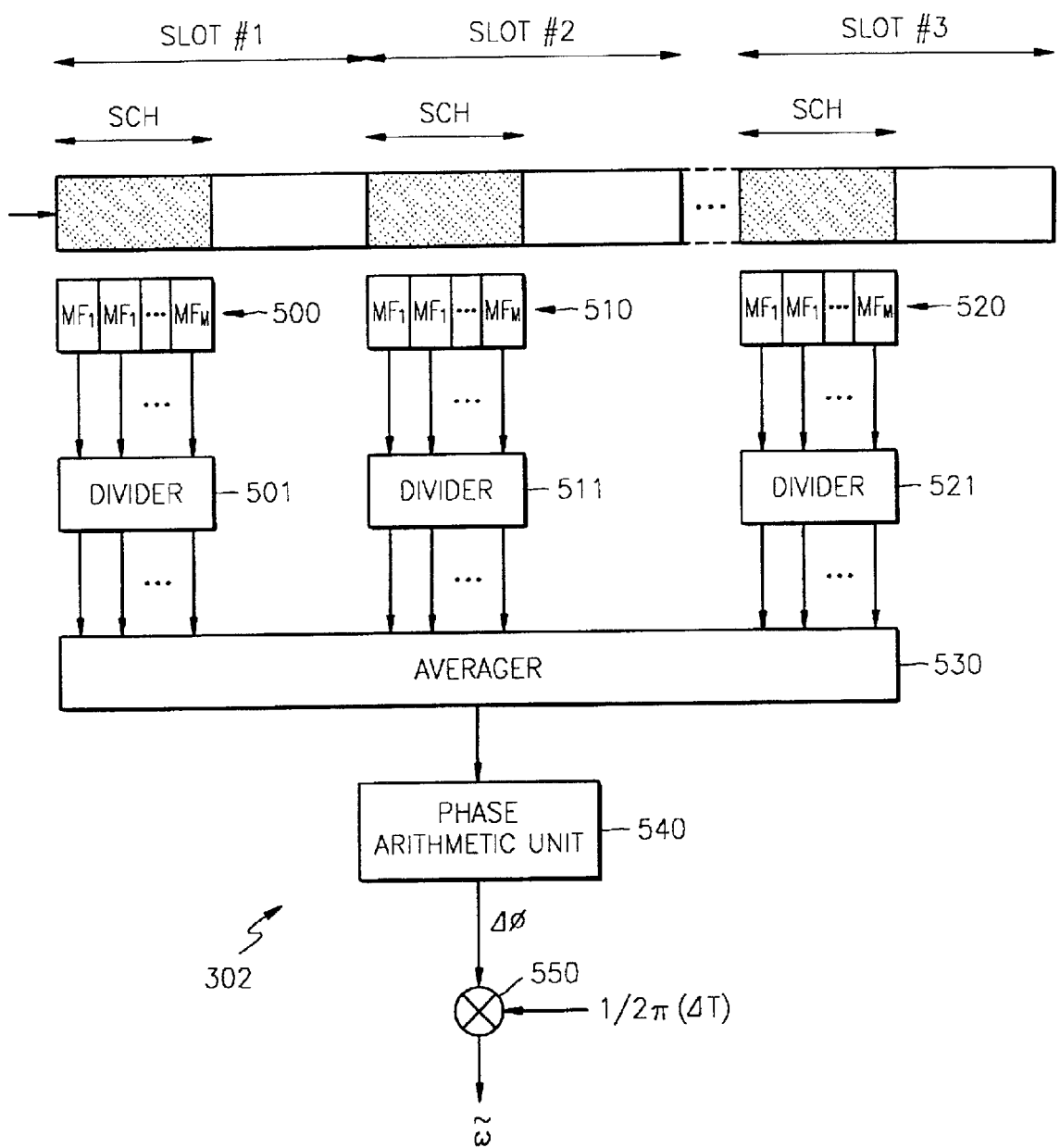
FIG. 5 is a detailed diagram that illustrates the frequency error estimator of FIG. 3.

FIG. 5 is a detailed block diagram that illustrates the operation of the frequency error estimator 302 in detail. The frequency error estimator 302 includes a plurality of partial correlation units 500, 510 and 520, a plurality of dividers 501, 511 and 521, an averager 530, a phase arithmetic unit 540 and a multiplier 550.

In the operation of the frequency error estimator 302, each of the partial correlation units 500, 510 and 520 divides the SCH of a 256-chip length in each slot into M blocks with respect to the output SCH of the ADC 240 and partially correlates the complex conjugate of the PSC generated by the PSC generator 252 with the M blocks of the SCH. In other words, instead of total correlating the 256-chip SCH with the 256-chip PSC, the PSC is divided into M blocks having a chip length which is integral times of 16, and partial period correlation is performed on each block. Here, M is one among 2, 4, 8 and 16. Each of the partial correlation units 500, 510 and 520 is preferably realized as a matched filter or an active correlator. The outputs of the partial correlation units 500, 510 and 520 are phase values.

Specifically, frequency error estimation according to the present invention is accomplished based on the correlation property in which a PSC is orthogonal to a SSC at every 16 chips as shown in Equation (2).

$$\sum_{i=16I}^{16(I+J)-1} C_p(i) C_s^n(i) = 0 \tag{2}$$

where n indicates the index of a SSC and is one of 1, 2, ... 16, I is zero or a positive number larger than 0, J is 1 or a positive number larger than 1, and (I+J)<16. In other words, the orthogonal property between a PSC and a SSC is maintained even though partial period correlation is performed on only the PSC and SSC having a chip length which is integral times of 16, instead of performing entire period correlation on the 256-chip PSG and SSG.

It is assumed that a complex signal of each chip received during the SCH period of a single slot is referred to as r(n). In a flat fading environment, that is, when a multipath does not exist, the complex signal r(n) can be expressed by Equation (3).

$$r(n)=h(n)x(n)+N(n) \quad (n=0, 1, \ldots 255) \quad (3)$$

where x(n) is a transmitted complex SCH signal, h(n) is a complex channel through which the signal has been transmitted, and N(n) is complex Gaussian noise. Here, x(n) can be expressed by Equation (4).

$$P(n)=PSC(n)+jPSC(n)$$
$$S_i(n)=SSC_i(n)+jSSC_i(n)$$
$$x(n)=P(n)+S_i(n) \quad (4)$$

If there is a frequency error $f_e$, r(n) changes into Equation (5).

$$r(n)=h(n)x(n)exp[j(2\pi f_e T_c+\Phi)]+N(n) \quad (5)$$

where $T_c$ is a chip duration, and $\Phi$ is a phase having a uniform distribution at a period $[0, 2\pi]$. A signal received for a SCH period is divided into M blocks of a 16N-chip length. N is one among 1, 2, 4 and 8, and M=16/N. The signal is divided by a 16N-chip length in order to use the property in that an at least 16-chip PSC is orthogonal to an at least 16-chip SSC. In this embodiment, two assumptions are made. One is that a channel does not change during the SCH period. The other is that phases due to frequency errors $\Phi_0$, $\Phi_1, \ldots$ and $\Phi_{M-1}$ are constant for a single period, one of the M blocks, and $\Phi_{M/2+m}-\Phi_m=2\pi f_e (128T_c)$.

The first assumption is reasonable under actual conditions. The second assumption means that a signal has the same phase in a single period, and the phase difference between blocks separated from each other by 128 chips is the same as a phase variation due to a frequency error.

When the M blocks of a SCH signal are represented by $r_0(n), r_1(n), \ldots r_{M-1}(n)$, respectively, $r_m(n)$ (n=0, 1, ... M–1) is expressed by Equation (6) based on the second assumption.

$$r_m(n) = r(16Nm + n) \quad (6)$$
$$= h\exp(j\Phi_m \times (16Nm + n) + N(16Nm + n)$$

where n=0, 1, ... 16N–1, m=0, 1, ... M–1, and h is the magnitude of a complex channel.

When modeling the output SCH of the ADC 240 according to the above method, a SCH signal received during a single period can be considered as a signal in which noise is added to the result of multiplying a transmitted signal by a complex constant so that the correlation property between a PSC and a SSC can be used. The result $Y_m$ (m=0, 1, ... M–1) of correlating signals of M blocks with a PSC can be expressed by Equation (7).

$$Y_m = \sum_{n=0}^{16N-1} r_m(r)P^*(16Nm + n) \quad (7)$$
$$= kh\exp(j\Phi_m) + N_m$$

Here, k is a positive number, and $N_m$ is a component generated due to noise as the result of performing correlation on the PSC and the received signal. The correlation result $Y_m$ is obtained with respect to the M blocks. A phase variation in a duration of 128 chips corresponding to M/2 blocks can be obtained from M correlation results $Y_m$. The phase variation is obtained through the operations of the dividers 501, 511 and 521, the averager 530 and the phase arithmetic unit 540. In other words, each of the dividers 501, 511 and 521 pairs two values separated from each other by a length of 128 chips, that is, $Y_{M/2+m}$ and $Y_m$, among the outputs of each of the partial correlation units 500, 510 and 520 and performs divisions such as $Y_{M/2+m}/Y_m$. The averager 530 averages the outputs of the dividers 501, 511 and 521. The phase arithmetic unit 540 obtains the phase of the output of the averager 530. Here, a phase variation $\Delta\Phi$ may be obtained by individually obtaining the phases of respective outputs of the dividers 501, 511 and 521 and averaging the phases. The results of the above operations can be expressed by Equation (8).

$$\Delta\Phi_m = \tan^{-1}\left[\frac{Im(Y_{M/2+m}/Y_m)}{Re(Y_{M/2+m}/Y_m)}\right] (m = 0, 1, \ldots M/2 - 1) \quad (8)$$

$$\Delta\Phi = \text{Average } [\Delta\Phi_m]$$

The multiplier 550 multiplies the phase variation $\Delta\Phi$ by $1/[2\pi(\Delta T)]$ and outputs a frequency error estimate. In this embodiment, $\Delta T$ is 128 $T_c$. The frequency error estimate is expressed by Equation (9).

$$\tilde{f} = \frac{\Delta\Phi}{2\pi(128T_c)} \quad (9)$$

The present invention estimates a frequency error and compensates for the error, thereby improving the performance of searching for a cell and eventually reducing the cell search time. When using the present invention, a cell search can be accomplished only by adding a simple operation so that the burden of additional hardware can be reduced. In addition, the method of estimating and compensating for a frequency error can be applied to automatic frequency control or NCO control in a software, wireless system.

While the present invention has been described in terms of a preferred embodiment, those of ordinary skill in the art will recognize that various modifications may be made to the invention without departing from the spirit and scope thereof.

What is claimed is:

1. A cell searching apparatus which searches for a cell based on a received asynchronous wideband direct-sequence code division multiple access (DS/CDMA) signal in a receiver, the received signal including a data channel and a synchronous channel composed of a primary synchronization code commonly used in every cell and a secondary synchronization code indicating a code group unique to each cell, the cell searching apparatus comprising:

a code group identifying unit for estimating and compensating for a frequency error between the synchronous channel and an internally generated primary synchronization code, estimating and compensating for channel characteristics which the synchronous channel has experienced, and correlating the compensated synchronous channel with available secondary synchronization codes, thereby identifying the code group; and a scrambling code identifying unit for correlating a plurality of scrambling codes belonging to the code group with the data channel, thereby obtaining a scrambling code unique to each cell.

2. The cell searching apparatus of claim 1, wherein the code group identifying unit comprises:

a primary synchronization code generator, a frequency error compensator for estimating a frequency error between the synchronous channel and a primary synchronization code generated by the primary synchronization code generator and compensating the synchronous channel for the estimated frequency error;

a channel compensator for estimating channel characteristics from the frequency error compensated synchronous channel and compensating the frequency error compensated synchronous channel for the estimated channel characteristics; and a code group identifier for combining the results of correlating the channel characteristics compensated synchronous channel with the available plurality of primary synchronization codes, thereby identifying the code group.

3. The cell searching apparatus of claim 2, wherein the frequency error compensator comprises:

a switch having an input and a first and a second output and operating such that the synchronous channel can be received through the input;

a frequency error estimator connected to the first output of the switch, the frequency error estimator obtaining the phase difference between the synchronous channel and the primary synchronization code generated by the primary synchronization code generator and converting the phase difference into a frequency error;

a numerically controlled oscillator for generating a complex sinusoidal wave corresponding to the frequency error; and a multiplier connected to the second output of the switch, the multiplier multiplying the synchronous channel input through the switch by the complex sinusoidal wave.

4. The cell searching apparatus of claim 3, wherein the frequency error estimator comprises:

a plurality of partial correlation units each for correlating the synchronous channel divided into a predetermined number of blocks in each slot with the primary synchronization code generated by the primary synchronization code generator;

a divider for dividing one output by another output among the outputs of the partial correlation units, the two outputs being separated from each other by a predetermined chip duration;

a phase arithmetic unit for obtaining a phase from the outputs of the divider; and a multiplier for converting the phase into a frequency by dividing the output of the phase arithmetic unit by the predetermined period of time.

5. The cell searching apparatus of claim 4, wherein the frequency error estimator further comprises an averager for summing up the output of the divider a predetermined number of times and averaging the sum of the outputs using the predetermined number of times.

6. The cell searching apparatus of claim 2, wherein the code group identifier comprises:

a plurality of correlation units for correlating the output of the channel compensator with the plurality of secondary synchronization codes;

a coherent combiner for summing up the outputs of the correlation units and squaring the sum of the outputs; and a detection means for detecting a secondary synchronization code at which the output of the coherent combiner exceeds a predetermined value.

7. A method of acquiring a scrambling code included in a code group from an asynchronous wideband direct-sequence code division multiple access (DS/CDMA) signal received in an asynchronous wideband DS/CDMA receiver, the received signal including a data channel and a synchronous channel composed of a primary synchronization code commonly used in every cell and a secondary synchronization code indicating a unique code group of each cell, the scrambling code being a spreading code unique to each cell, the method comprising:

(a) estimating and compensating for a frequency error between the synchronous channel and a primary synchronization code generated by a primary synchronization code generator;

(b) estimating and compensating for characteristics of a channel which the synchronous channel has experienced;

(c) correlating the compensated synchronous channel with available secondary synchronization codes, thereby identifying a secondary synchronization code included in the synchronous channel; and (d) correlating a plurality of scrambling codes belonging to a code group represented by the secondary synchronization code with the data channel to obtain a scrambling code unique to each cell.

8. The method of claim 7, wherein (a) further comprises:

(a1) dividing the synchronous channel into a predetermined number of blocks in each slot and correlating the divided synchronous channel with the primary synchronization code generated by the primary synchronization code generator;

(a2) dividing one output by the other output among the results of the correlation, the two results of the correlation being separated from each other by a predetermined chip duration;

(a3) obtaining a phase from the result of the division;

(a4) dividing the phase by the predetermined period of time to convert the phase into a frequency; and (a5) compensating the synchronous channel for the frequency.

9. The method of claim 8, wherein in (a1), each of the blocks of the synchronous channel has a chip length which is integral times of 16.

10. The method of claim 8, wherein in (a2), the predetermined period of time corresponds to ½ of a chip length of the synchronous channel.

* * * * *